Sept. 8, 1959 H. VOGT 2,903,496
ALKALINE ACCUMULATOR
Filed Sept. 16, 1954 3 Sheets-Sheet 1
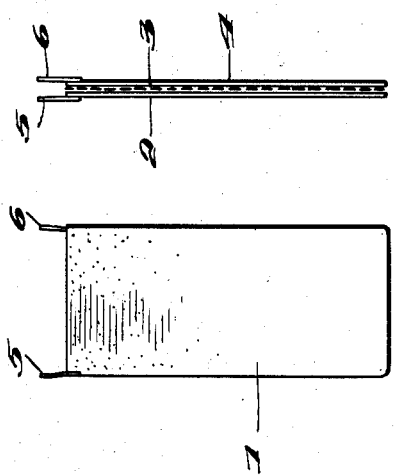
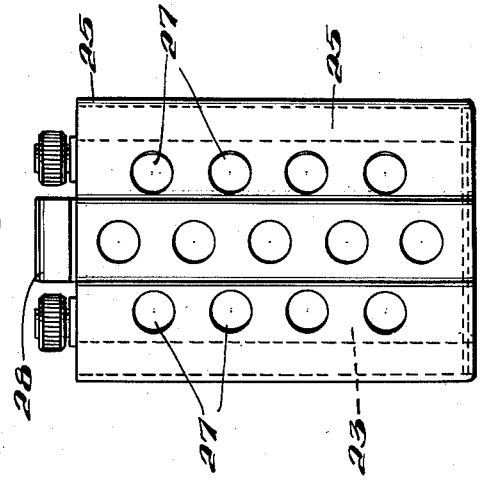
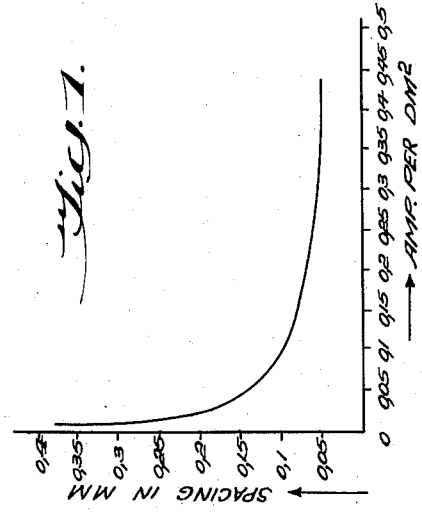
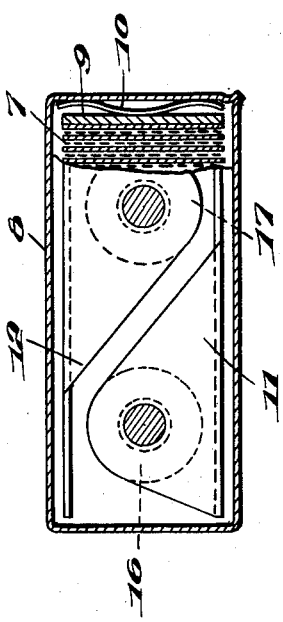
INVENTOR
Hans Vogt
BY Pierce, Scheffler & Parker
ATTORNEYS Sept. 8, 1959 H. VOGT 2,903,496
ALKALINE ACCUMULATOR
Filed Sept. 16, 1954 3 Sheets-Sheet 2
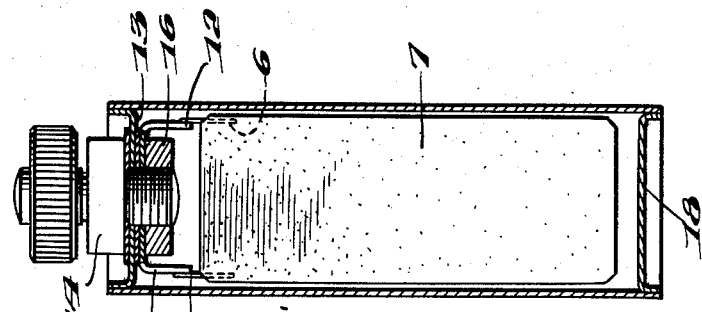
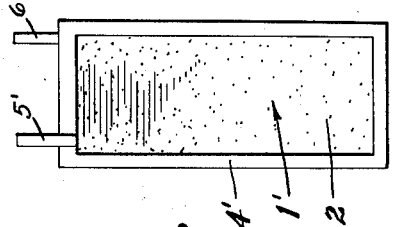
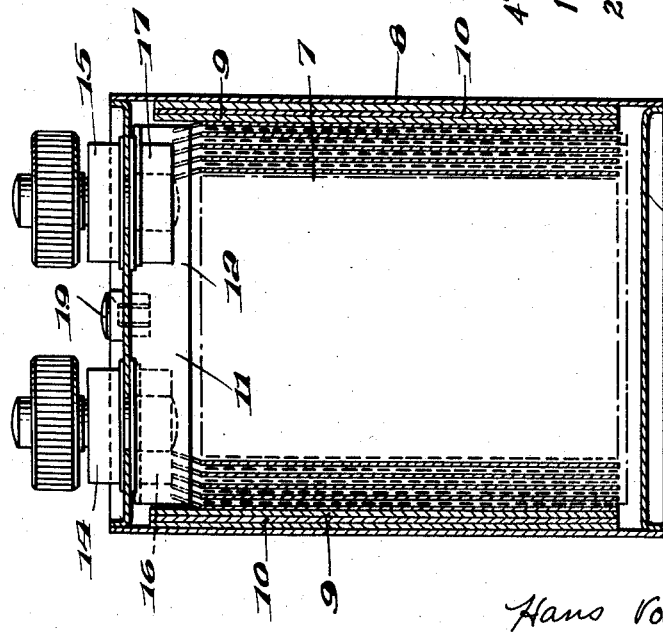
INVENTOR
Hans Vogt
BY Pierce, Scheffler & Parker
ATTORNEYS Sept. 8, 1959  H. VOGT  2,903,496
ALKALINE ACCUMULATOR
Filed Sept. 16, 1954  3 Sheets-Sheet 3
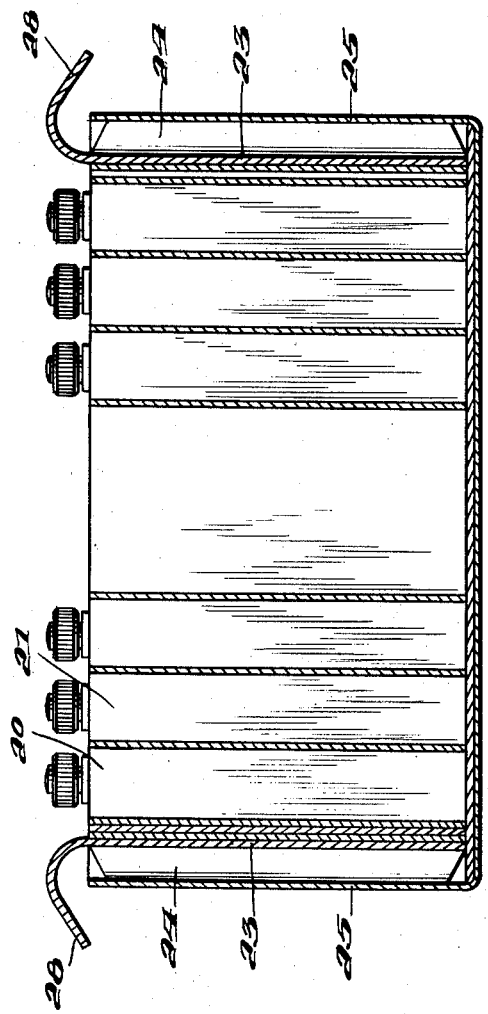
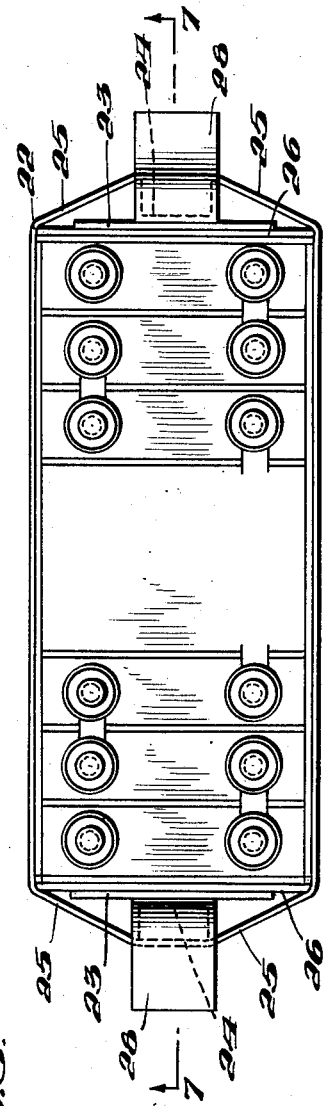
INVENTOR
Hans Vogt
BY Pierce, Scheffler & Parker
ATTORNEYS

United States Patent Office 2,903,496
Patented Sept. 8, 1959

2,903,496

ALKALINE ACCUMULATOR

Hans Vogt, Erlau, near Passau, Germany

Application September 16, 1954, Serial No. 456,429

Claims priority, application Germany September 19, 1953

1 Claim. (Cl. 136—6)

This invention relates to a gas-tightly sealed alkaline accumulator of the type in which the electrochemically active electrode substance is accommodated in the pores or cavities of a sintered skeleton consisting of a sintered metal powder layer which is as thin as a leaf or foil, the electrodes thus formed being compacted into an electrode package or coil with minimum distance between the layers, said distance being defined by separators in the form of highly porous fabrics of glass, synthetic resin or lye-resistant fibres, e.g. cellulose.

It is an object of the present invention to provide an accumulator of the type referred to which can be overcharged or overdischarged with a predetermined maximum current without the accumulation of gases.

Another object of the invention is to provide means ensuring that the gas generated on an electrode surface of one polarity immediately after its generation gets to the oppositely disposed electrode surface of different polarity for being electrically oxidized or reduced in per se known manner.

With these and further objects in view, according to the present invention the surfaces of adjacent electrodes of different polarity are arranged in the electrode package or coil with a very small gap between the parallel electrode surfaces.

A very small gap in the sense of the present invention is obtained by a separator of a preferably highly porous fabric of a thickness of not more than 0.15 millimeter, and preferably 0.08 millimeter, between electrodes of different polarity, said separator forming between the adjacent electrode surfaces a separating layer which is just sufficient to provide the required disruptive strength. It has been found out by experiment that in this case no gas is accumulated in the casing of the cell if the charging current amounts to $\frac{1}{5}$ to $\frac{1}{20}$ C, wherein the factor $C=I/Ah$ ($I$=current strength, $Ah$=ampere hours).

The separator may consist of a highly porous layer of synthetic material on the electrodes, which layer is deposited on the electrode surface or formed by an inserted sheet.

Other and further objects, features and advantages of the invention will be pointed out hereinafter and appear in the appended claim forming part of the application.

In the accompanying drawings several now preferred embodiments of the invention are shown by way of illustration and not by way of limitation.

Fig. 1 is a chart in which the distance between the electrode surfaces, expressed in millimeters, is plotted against the overcharging current density, expressed in ampere hours per square decimeter, Fig. 2 is a front view of an electrode having the invention applied thereto, Fig. 2a is a front view of another embodiment of the invention of Fig. 2, Fig. 3 is a diagrammatic cross sectional view of this electrode, Fig. 4 is a sectional view of a cell having the invention applied thereto, Fig. 5 is a section at right angles to that of Fig. 4, Fig. 6 is a top plan view of said cell, partly in section, Fig. 7 is a sectional view along line 7—7 of Fig. 8 showing a battery of such cells, Fig. 8 is a top plan view thereof, and Fig. 9 is an end view of the apparatus.

Similar reference numerals denote similar parts in the different views.

Referring now to the drawings in greater detail, and first to Fig. 1, showing an experimentally obtained curve, it will be noted that various electrode distances have been plotted against those maximum charging currents per square decimeter which in case of the respective electrode distance would not yet cause a generation of gas of such an intensity that an accumulation of gas would result. It will be seen from this curve that the electrode distance is the decisive factor for solving the problem underlying the present invention.

The electrodes preferably used for my novel accumulators are exemplified in Figs. 2 and 3 and may be for example of the type described in my U.S. Patent 2,681,375 or U.S. Patent 2,820,077 (French priority March 17, 1953). The thickness of each electrode 2 or 4 is about 0.5 millimeter, the pores 1 occupying 80 percent of the total volume of the electrode and being filled with hydroxide of cadmium in case of a cathode (2) and with hydroxide of nickel in case of an anode (4). A pair of positive and negative electrodes 2, 4 having an active surface of about 100 square centimeters is required for obtaining a capacity of 1 ampere hour. The permanent strength of charging current admissible in case of an electrode distance of 0.08 millimeter between the active surfaces in the arrangement as per Fig. 3 would be 0.1 ampere in case of $\frac{1}{10}$ C. The contact lugs of the electrodes 2 and 4 are shown at 5 and 6, respectively.

It is important, in order to ensure an efficient retransformation of the gas being formed during the charging or discharging that the distance between the adjacent electrodes of different polarity is substantially uniform. Even small differences caused by uneven electrode surfaces would impair the effect. Therefore, it is preferred to smooth or equalize the surfaces of the electrodes before they are combined into an electrode pack or coil, by rolling or similar methods, such for example as those disclosed in U.S. Patents 2,157,596 and 2,820,077. In U.S. Patent 2,157,596, rolling of sintered products and hence smoothing subsequent to sintering is described on page 2, col. 1, lines 7–16, inclusive. In U.S. Patent 2,820,077 (French priority March 17, 1953) rolling of sintered electrodes subsequent to sintering and hence smoothing is described at column 5, lines 14–31, inclusive.

By using electrodes equalized in this way it is also ensured that internal short-circuits caused by irregularities of the electrode surface piercing the separator will not occur even with the use of very thin separator inserts of a thickness of 0.15 millimeter or less.

In order to obtain serviceable gas-tight accumulators even with separators of a thickness of about 0.15 millimeter, it is preferred to use electrodes having a thickness of 0.25 millimeter only instead of the above mentioned thickness of 0.5 millimeter. Thus the accumulator can be overcharged, without accumulation of gas with the same charging current but with a current density of the charge which is reduced owing to the doubling of the surface.

The voltage occurring during the process of reconversion of the gas is about 0.15 v. This is probably due to the fact that owing to the narrow spacing between the active electrode surfaces the resulting gas bubbles can combine with each other in statu nascendi, this process being catalytically assisted by the finely distributed metallic cadmium and by the trivalent hydroxide of nickel.

The separators 3 between the electrodes 2, 4, Fig. 3 preferably consist of substances having high insulating power and a high permeability for ions and gas. For instance, thin fabrics of glass and synthetic resin filaments, cellulose hydrate foils, which may be provided with fine perforations, thin fabrics of natural silk, cotton, acetate silk, filter paper impregnated with dilute solutions of polyvinyl chloride, polystyrol, or similar synthetic resin, can be used.

The electrodes may be compacted in the form of a coil or pack. Since it is important to have a small uniform distance between the electrodes with any operating condition of an accumulator, the electrodes preferably will be arranged in such a way that a favorable pressure per unit of electrode area is ensured.

In order to avoid the detrimental effects of active edges not opposed to complementary surfaces of different polarity and thus not partaking in the gas reconversion process, the edges of the electrodes may be coated with an insulating layer. Also, the electrodes of different polarity may be of different size, in such a way that for instance, when superposed, the negative electrodes project beyond all edges of the positive electrodes. As shown in Fig. 2a, the negative electrode 4' projects beyond all edges of the positive electrode 2'. Also the two measures, i.e. overlapping of the electrodes of one polarity and insulation of the free edges may be combined. Anyway, surface areas generating gas and not being opposed to surfaces of different polarity for reconversion of the gas, with a small distance, should be avoided.

Embodiments of cells and batteries realizing these constructional principles are illustrated in Figs. 4 to 9.

Referring to Figs. 4, 5, and 6, it will be seen that a plurality of electrodes as per Fig. 2 are combined into an electrode pack 7 and inserted in a metallic casing 8, separators 3 of a thickness of 0.12 millimeter being arranged between adjacent surfaces of the alternately arranged anodes 2 and cathodes 4, and defining the electrode distance thereof. Each of electrodes 2 and 4 consists of finely porous skeleton layers deposited on both sides of a carrier layer (not shown), by a sintering process, and having a thickness of 0.25 millimeter on each side of the carrier layer.

In order to maintain the small distance of adjacent electrodes required in accordance with the present invention, the electrode pack 7 is held in the casing 8 by pressing plates 9 and compression springs 10 which are inserted between the inner wall of the casing and the electrode pack 7, under preliminary tension, as best shown in Fig. 6. The terminals of the electrodes are formed by lugs or wires 5 and 6 welded to the plates, and being connected, in case of the anode lugs, with a contact sheet 11, and in case of the cathode lugs, with a contact sheet 12, by electric welding. The contact sheets 11 and 12 are shaped so as to form each a contact bar for all anodes or cathodes, respectively, of the electrode pack 7. The cover 13 of the casing or can carries the electrode pack 7 and is gas tightly welded into the casing 8, being traversed by connecting screws 14 and 15 forming packing rings which are urged against the cover 13 by means of nuts 16 and 17, packing washers being interposed as shown, said nuts 16 and 17 also connecting the contact sheets 11 and 12 with the contact screws 14 and 15. The bottom 18 of the casing 8 is also welded thereto so as to form a gastight seam or joint. The cover 13 is formed with a fill hole 19, which can be gas-tightly closed or sealed as shown.

Fig. 7 shows an arrangement in which several gas-tight accumulator cells as per Fig. 4 are combined into a storage battery. A plurality of adjacent accumulator cells 20, 21 are accommodated in a common outer case 22, in such a way that their adjacent surfaces tightly engage each other and that the outer case forms a stiffening or reinforcement for the inserted cells. For this purpose, the narrow sides of the additional outer case 22 which correspond to the broader sides of the cells inserted therein, are stiffened against internal pressure action. Owing to the covering plates 25 the additional plates 23 and U-pieces 24 have a stabilizing effect for the surfaces 26 of the case. For reducing the weight of the case, the outer covering plates 25 are provided with holes 27. The stiffening plates 23 are formed into carrier hooks 28.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claim.

I claim:

In a sealed alkaline accumulator a container, at least one positive and one negative electrode plate within said container, each plate comprising thin porous layers of sintered material, the layers of respective plates having positive and negative active material incorporated within their pores, said electrode plates each having rolled faces and being positioned parallelly in face-to-face relationship, and said negative electrode plate having a greater surface area than the positive electrode plate so that its peripheral edges overlap the corresponding peripheral edges of the positive electrode plate, a separator between opposing adjacent rolled faces of said plates, said separator comprising a thin continuous layer of porous insulating material having substantially uniform thickness in the range of from approximately 0.08 to 0.15 mm., and resilient biasing means within said container positioned other than between the said opposing adjacent roller faces for exerting substantially uniform biasing pressure on said plates and said separator to effect intimate parallel surface contact between said separator and said adjacent rolled faces of said plates over the entire areas of contact of said plates and separator and parallel uniform spacing by said separator between said opposing rolled faces of said plates.

References Cited in the file of this patent
UNITED STATES PATENTS

| | | |
|---|---|---|
| 1,467,240 | Doe | Sept. 4, 1923 |
| 2,256,105 | Shank | Sept. 16, 1941 |
| 2,543,137 | Uber | Feb. 27, 1951 |
| 2,571,927 | Neumann et al. | Oct. 16, 1951 |
| 2,602,843 | Brennan | July 8, 1952 |
| 2,646,455 | Jeannin | July 21, 1953 |
| 2,708,211 | Koren et al. | May 10, 1955 |